United States Patent [19]

Lawrence et al.

[11] 4,122,142
[45] Oct. 24, 1978

[54] METHOD FOR BLOW MOLDING A REINFORCED PLASTIC BOTTLE

[75] Inventors: Don L. Lawrence; Albert R. Uhlig, both of Toledo, Ohio

[73] Assignee: Owens-Illinois, Inc., Toledo, Ohio

[21] Appl. No.: 822,142

[22] Filed: Aug. 5, 1977

[51] Int. Cl.² .......................... B29C 17/07; B29D 3/02
[52] U.S. Cl. ........................................ 264/97; 264/89; 264/98; 425/523; 425/530
[58] Field of Search ....................... 264/89, 94, 96, 99, 264/DIG. 52; 425/523, 530; 215/1 C, 12 R; 29/450

[56] References Cited

U.S. PATENT DOCUMENTS

| | | | |
|---|---|---|---|
| 2,792,593 | 5/1957 | Hardgrove, Jr. | 425/384 |
| 2,805,787 | 9/1957 | Sherman | 425/523 X |
| 3,010,867 | 11/1961 | Sannipoli et al. | 29/450 X |
| 3,223,760 | 12/1965 | Roberts et al. | 264/94 |
| 3,423,494 | 1/1969 | Roberts | 264/94 |

FOREIGN PATENT DOCUMENTS

| | | | |
|---|---|---|---|
| 1,279,319 | 10/1968 | Fed. Rep. of Germany | 264/94 |
| 1,432,302 | 4/1976 | United Kingdom | 264/94 |

Primary Examiner—Jan H. Silbaugh
Attorney, Agent, or Firm—R. D. Heberling; D. H. Wilson, Jr.; M. E. Click

[57] ABSTRACT

A method is disclosed for reinforcing bottles with a tubular netting embedded in an exterior surface of the bottle. A tubular netting section is initially compressed in an axial direction to increase its diameter. The compressed netting is positioned over a preformed parison of a thermoplastic material. The compressed netting is then released to re-expand axially and contract diametrically, until the netting contacts the parison. The parison is finally transferred to a blow mold and blown into a finished bottle. During the blowing operation, the netting is embedded into and reinforces the walls of the blown bottle. Depending upon the materials from which the netting and bottle are formed, the netting may also weld to the bottle wall to further increase the strength of the bottle.

2 Claims, 9 Drawing Figures

METHOD FOR BLOW MOLDING A REINFORCED PLASTIC BOTTLE

BACKGROUND OF THE INVENTION

This invention relates to bottles and similar articles blow molded from a thermoplastic material and more particularly to an improved method for reinforcing a bottle blow molded from a thermoplastic material. Many hollow articles, such as bottles, are blow molded from thermoplastic material. Such bottles commonly are used as packages for cosmetics and liquid food items which are either at atmospheric pressure or pressurized with a compressed gas. It is generally desirable to maximize the strength of bottles of this type for various reasons. When a liquid contained within a bottle is under pressure, bottles strength is important to prevent the bottle from rupturing. The bottle strength is also important since increasing the strength of a material from which a bottle is blown permits reducing the wall thickness without a loss in strength of the bottle. This in turn reduces the cost of the bottle and also reduces its weight when the bottle is shipped from the bottle manufacturer to a product manufacturer which fills the bottle and subsequent shipment of the filled bottle to the ultimate consumer. By modifying the design of a bottle to achieve a maximum strength, it is also possible to improve the appearance of the bottle and to to add gripping strength to the bottle to prevent accidental dropping.

Various prior art methods have been used for increasing the strength of bottles blow molded from thermoplastic materials, and particularly synthetic resinous materials. One method involves adding an impact modifier to the base resin from which the bottle is blown. Still another method for increasing the strength consists of increasing the wall thickness, which in turn provides the disadvantages of an increased cost and an increased bottle weight. The strength of a blown bottle has also been increased through design techniques which involve shaping the bottle to eliminate weak spots, and in some cases, adding reinforcement ribs to either the interior or exterior surfaces of the bottle. Still another method for increasing the strength of a bottle consists of carefully controlling the blowing techniques to biaxially orient the synthetic resinous material from which the bottle is manufactured. However, biaxial orientation is achieved only through careful control of the thermal history of the thermoplastic material from which the bottle was blown. If the thermal history is not carefully controlled, variations will occur in the degree of orientation of blown bottles and, as a consequence, the strength of the bottles will vary.

SUMMARY OF THE INVENTION

According to the present invention, an improved method is provided for blow molding reinforced bottles from a thermoplastic material. The method generally comprises embedding or fusing a reinforcement netting in an exterior surface of the bottle during the blowing process. The resulting bottles have a uniformly high strength and an improved appearance and gripping strength over many prior art bottles while also having thinner walls and, hence, a lighter weight.

Initially, a parison is formed from hot thermoplastic material either by extrusion or by injection molding. The parison is then preformed in a pre-blow mold and, at the same time, a finished bottle neck is molded. While the parison is still hot, it is removed from the pre-blow mold and a tubular netting is positioned over the parison. The netting, which may be formed from a synthetic resinous material or from a metallic wire, is positioned on the parison by compressing in an axial direction to expand the diameter of the netting to a diameter greater than that of the preformed parison. The netting is slipped over a free end of the parison and released. At this time, the netting extends in an axial direction and contracts in diameter into contact with the hot parison. The parison and netting are then transferred to a final blow mold cavity and the parison is blown into a finished article. During the blowing operation, the netting is embedded into the exterior surface of the blown article and, in the case of a netting formed from many synthetic resinous materials, also welds or fuses directly to the bottle material. After the thermoplastic material has cooled or set, the finished bottle is removed from the blow mold cavity. The resulting bottle may have a textured exterior surface to increase the gripping strength of the bottle and also has a high strength due to the netting embedded in or fused to the bottle walls. This permits the thickness of the bottle walls and, hence, reducing the weight of the bottle, without a a loss in bottle strength.

Accordingly, it is an object of the invention to provide an improved method for blow molding bottles from hot thermoplastic materials.

Another object of the invention is to provide a method for reinforcing bottles which are blow molded from a thermoplastic material.

Still another object of the invention is to provide a method for blow molding a reinforced bottle having a textured exterior surface.

Other objects and advantages of the invention will become apparent from the following detailed description, with referencee being made to the accompanying drawings.

DESCRIPTION OF THE PREFERRED EMBODIMENT

Figures 1, 2, 4:
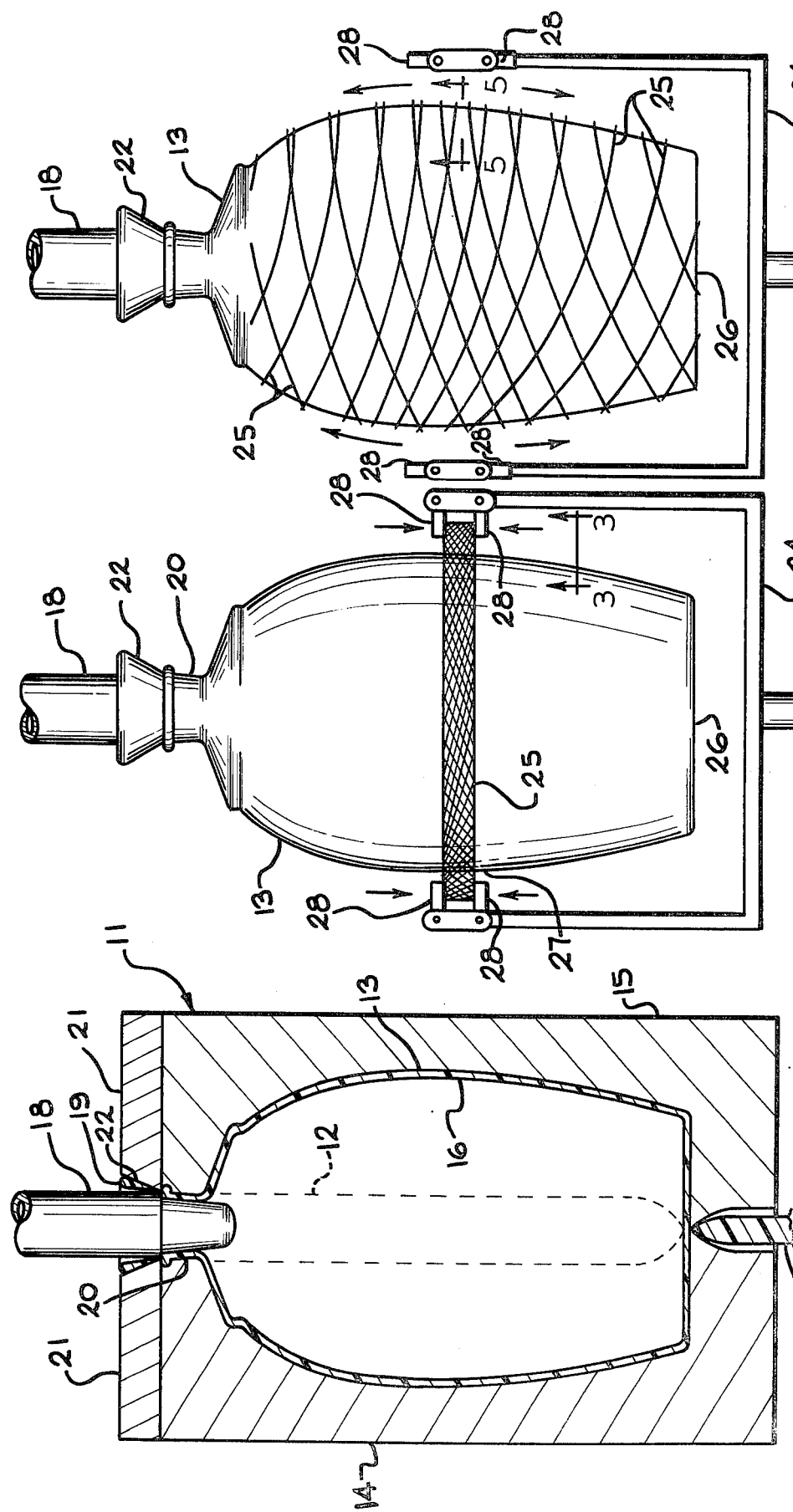
FIG. 1 is a vertical cross sectional view of an extruded tubular parison being preformed in a preform mold.
FIG. 2 is a side elevational view showing the positioning of a compressed reinforcement netting over the preformed parison.
FIG. 4 is a side elevational view showing the reinforcement netting expanded and in contact with the preformed parison.

Turning now to the drawings and particularly to FIG. 1, a vertical cross sectional view is shown through a preform blow mold 11 in which an extruded tubular parison 12 is blown to form a preformed parison 13. The preform or pre-blow mold 11 generally comprises a pair of mold shells 14 and 15 which, when positioned together, define a cavity 16. The tubular parison 12 is initially extruded in a conventional manner and the mold shells 14 and 15 are then closed upon the parison 12. The tubular parison 12 is extruded with excessive thermoplastic material which is pinched between the closed mold sections 14 and 15 to define a tail 17 which may be separated from the preform mold 11 by pulling. After the tubular parison 12 is positioned within the cavity 16, a blow pin 18 is inserted within a upper end 19 of the parison 12. The blow pin 18 and the mold cavity 16 are shaped to mold a bottle neck 20 in the preformed parison 13. A pair of striker plates 21 which are closed with the mold shells 14 and 15 are contacted by the blow pin 18 to separate flash or moil 22 at the upper end 19 of the parison 12 from the molded bottle neck 20. Air is then injected through the blow pin 18 to expand the tubular parison 12 into contact with the mold cavity 16 for defining the preformed parison 13.

After the preformed parison 13 is blown in the preform mold 11, the mold shells 14 and 15 and striker plates 21 are separated and the preformed parison 13 is then transferred to the next station in the manufacturing process. If desired, the preformed parison 13 may be allowed to cure or soak in the preform mold 11 for a short period of time to provide a desired temperature history for the preformed parison 13 prior to transfer to the next station. In a modified method, the preformed parison is formed by injection molding.

The preformed parison 13 is transferred from the preform mold 11 to a netting applicator station as shown in FIG. 2. At this point, the preformed parison 13 is supported on the blow pin 18. A netting applicator 24 is advanced from below the preformed parison 13 to move a reinforcement netting 25 from below a bottom 26 of the preformed parison 13 to adjacent a central region 27 of the preformed parison 13. The reinforcement netting 25 is tubular in shape and may be formed from a synthetic resin such as a polyethylene or a polypropylene or from a metal such as steel or aluminum wire. When the reinforcement netting 25 is of a synthetic resin, it should have a melting temperature higher than the temperatures that it will encounter during the blowing process and, also, it should be stronger than the thermoplastic material from which the preformed parison 13 is formed. In the case of a synthetic resin netting, the netting may be oriented to further increase its strength, provided that the temperatures encountered by the netting do not exceed the glass-transition temperature, namely, the lower temperature limit of molecular rearrangement for the material forming the netting.

Figure 3:
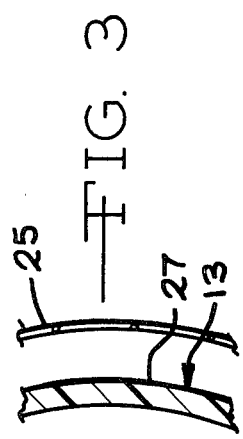
FIG. 3 is a cross sectional view along line 3—3 of FIG. 2.
Figure 5:
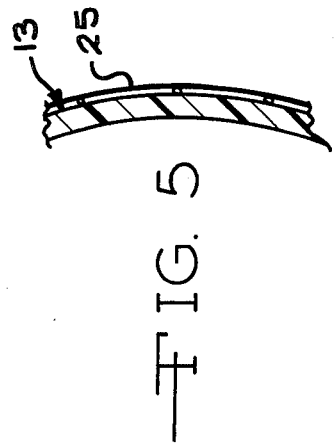
FIG. 5 is a cross sectional view taken along line 5—5 of FIG. 4.

The netting 25 is formed with a tubular shape having a normal diameter smaller than the diameter of the central region 27 of the preformed parison 13. However, when the netting 25 is compressed in an axial direction, the diameter increases to a point wherein it exceeds the diameter of the central parison region 27. Prior to inserting the netting 25 over the parison end 26, the netting 25 is compressed and held in the compressed state by fingers 28 on the netting applicator 24. This permits positioning the netting 25 coaxially over the preformed parison central region 27, as shown in FIGS. 2 and 3, without contacting and distorting the parison 13. The fingers 28 on the applicator 24 are then released and the netting 25 expands axially, as shown in FIGS. 4 and 5. When the tubular netting 25 expands, its diameter contracts until the netting 25 contacts the exterior surfaces of the preformed parison 13. The diameter changes in the expanded netting 25 may vary to conform with curved surfaces on the preformed parison 13, as shown in FIG. 4.

Figure 7:
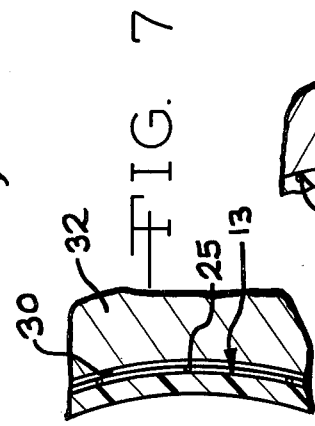
FIG. 7 is a cross sectional view along line 7—7 of FIG. 6.
Figure 6:
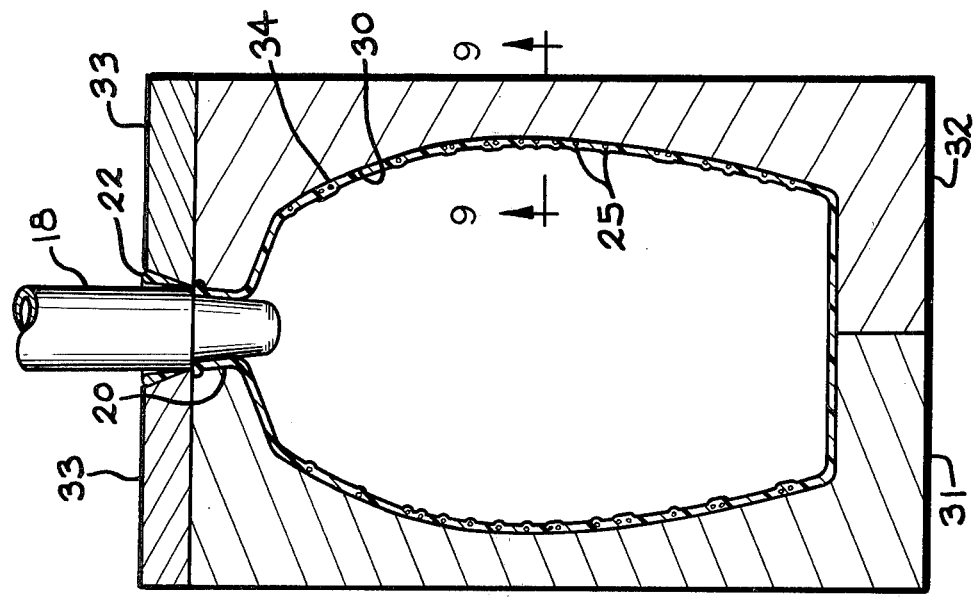
FIG. 6 is a vertical cross sectional view showing the preformed parison and reinforcement netting positioned within a final blow mold.

After the reinforcement netting 25 is positioned over the preformed parison 13 and allowed to expand into contact with the surfaces of the parison 13, the parison 13 is transferred into a cavity 30 in a final blow mold comprising separable mold shells 31 and 32. The mold shells 31 and 32 are closed about the preformed parison 13 and attached netting 25 while the parison 13 is supported from the blow pin 18. Striker plates 33 attached to the shells 31 and 32 are closed simultaneously with the mold shells. It will be noted from FIGS. 6 and 7 that the preformed parison 13 and attached netting 25 are only slightly smaller than the dimensions of the mold cavity 30.

Figure 9:
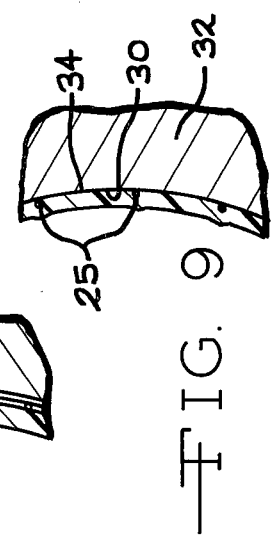
FIG. 9 is a cross sectional view along line 9—9 of FIG. 8.
Figure 8:
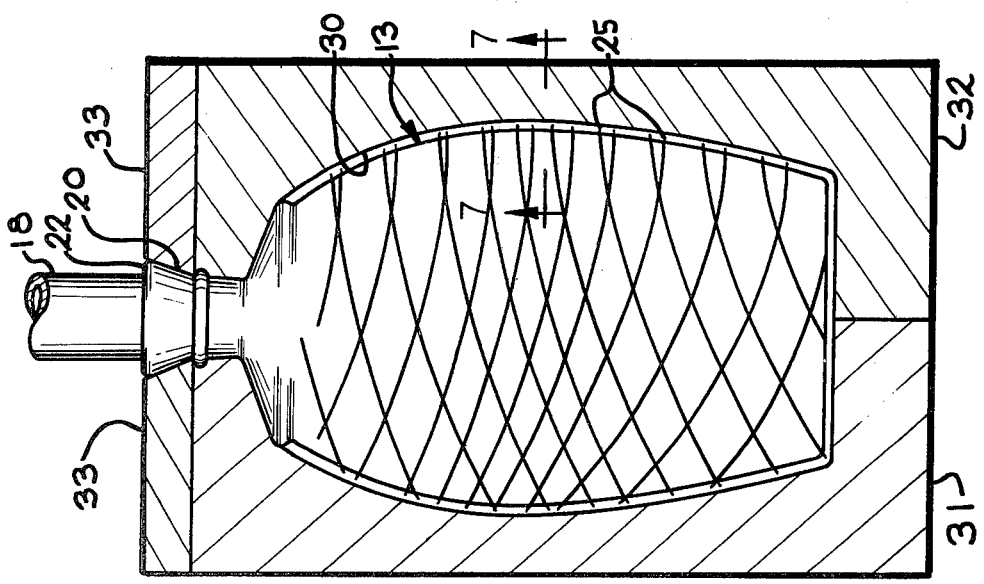
FIG. 8 is a vertical cross sectional view of a blown bottle in the final blow mold of FIG. 7.

After the preformed parison 13 and attached netting 25 are closed in the mold cavity 30, high pressure blow air is forced through the blow pin 18 to expand the parison 13 into contact with the mold cavity 30, thereby forming a finished bottle 34, as shown in FIGS. 8 and 9. Depending upon the nature and temperature of the netting 25 and the plasticity of the thermoplastic material from which the bottle 34 is blown at the time of the final blowing, the netting 25 may be completely embedded within the walls of the blown bottle 34 or the netting 25 may be only partially recessed within the exterior wall surfaces of the blown bottle 34. Also, the netting may only have a mechanical bonding with the plastic bottle material or the netting may actually weld or fuse to the plastic bottle material. By selecting different materials for the netting 25 and for the walls of the bottle 34, appearance and texture of the exterior surfaces of the bottle 34 may be varied. For example, the bottle 34 may be provided with a smooth exterior surface and with transparent walls when transparent thermoplastic materials are used for both the netting and the bottle. Or, the netting may be of a color different from that of the bottle to provide a decorative effect. In addition, the netting may be only partially embedded within the bottle walls to form both a decorative, non-slip surface on the bottle 34.

It will be appreciated that various changes and modifications may be made in the above described method for blow molding a reinforced bottle without departing from the spirit and the scope of the following claims. For example, the method in which the parison is supported by the blow pin during transfer from one station to another may be modified to other known methods without affecting the invention.

What I claim is:

1. A method for blow molding a reinforced bottle from a heated thermoplastic material comprising the steps of: performing a hollow parison of the heated material into a shape only slightly smaller than and of the same general contour as said bottle; positioning a reinforcing netting over and in conforming contact with said preformed parison; and while the material is still heated blowing said preformed parison into conformance with a final blow mold to form said bottle and to embed said netting into the walls of said bottle.

2. A method for blow molding a reinforced bottle, as set forth in claim 1, wherein said netting is positioned over said preformed parison by compressing in an axial direction a tube of netting having a normal diameter no larger than the diameter of the portions of said preformed parison contacted by said netting whereby the diameter of said tube increases to greater than the preformed parison diameter when said tube is compressed; positioning said compressed tube coaxially over said parison; and releasing said compressed tube whereby said tube expands in an axial direction and contracts in diameter into conforming contact with said parison.

* * * * *